Aug. 27, 1929. O. ARAM Re. 17,416
STOKER CONSTRUCTION
Original Filed Sept. 17, 1920 2 Sheets-Sheet 1
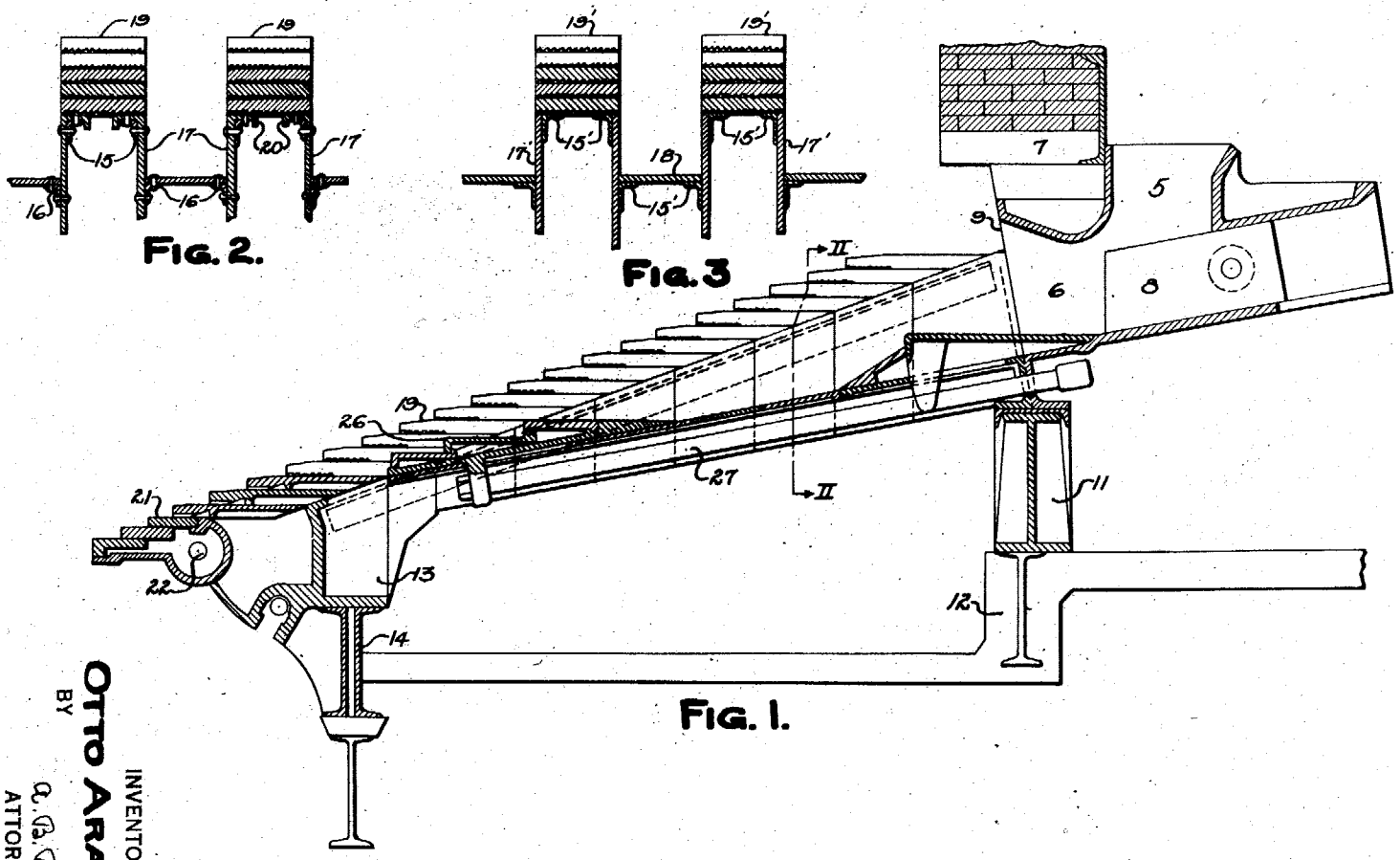
INVENTOR
OTTO ARAM.
BY
A. B. Davis
ATTORNEY Aug. 27, 1929. O. ARAM Re. 17,416

STOKER CONSTRUCTION

Original Filed Sept. 17, 1920 2 Sheets-Sheet 2

INVENTOR
OTTO ARAM.
BY
A. B. Rivers
ATTORNEY

Reissued Aug. 27, 1929. Re. 17,416

UNITED STATES PATENT OFFICE.

OTTO ARAM, OF ALLENTOWN, PENNSYLVANIA, ASSIGNOR TO WESTINGHOUSE ELECTRIC AND MANUFACTURING COMPANY, A CORPORATION OF PENNSYLVANIA.

STOKER CONSTRUCTION.

Original No. 1,558,215, dated October 20, 1925, Serial No. 410,865, filed September 17, 1920. Application for reissue filed July 10, 1929. Serial No. 377,304.

This invention relates to the mechanical stokers, and more particularly to stokers of the underfeed type wherein rows of tuyères and fuel-feeding retorts are alternately arranged in parallel relation and inclined from the front wall of the furnace to the dump grate.

An object of the invention is to provide a grate surface composed of parts of simple and durable construction which may be readily assembled or replaced without materially disturbing other parts of the grate.

Another object is to provide retorts constructed of fabricated frames upon which detachable side and bottom plates are mounted, thereby obtaining the advantage of the superior strength and durability of structural iron frames over the usual cast iron retorts which tend to warp and crack under the weight and heat of the tuyères and fuel bed usually supported by the retorts. By making the side and bottom walls detachable and sectional, they may be removed in case of failure without disturbing the tuyères or necessitating the removal of the retorts.

Another object is to provide a retort construction which securely ties the rear grate support or dump grate supporting casting to the upper casting usually disposed beneath the front wall of the furnace. The lateral strains imposed upon the dump grate casting and support are quite severe and frequently cause failure of the cast iron retort frames usually employed which are subjected to uneven temperatures and rapid temperature variations and are taxed to their full capacity in supporting the grates or tuyères. The structural or fabricated frames are better adapted to withstand the temperature variations without injury and do not warp out of shape.

These and other objects are attained by means of a stoker construction embodying the features herein described and illustrated in the drawings accompanying and forming a part hereof, wherein:

Figure 1 is a longitudinal vertical section through a stoker structure embodying my invention;

Figure 2 a section on the line II—II of Fig. 1 showing details of the retort construction;

Fig. 3 a section similar to that of Fig. 2 showing a modified retort construction;

Figures 4, 5, 6:
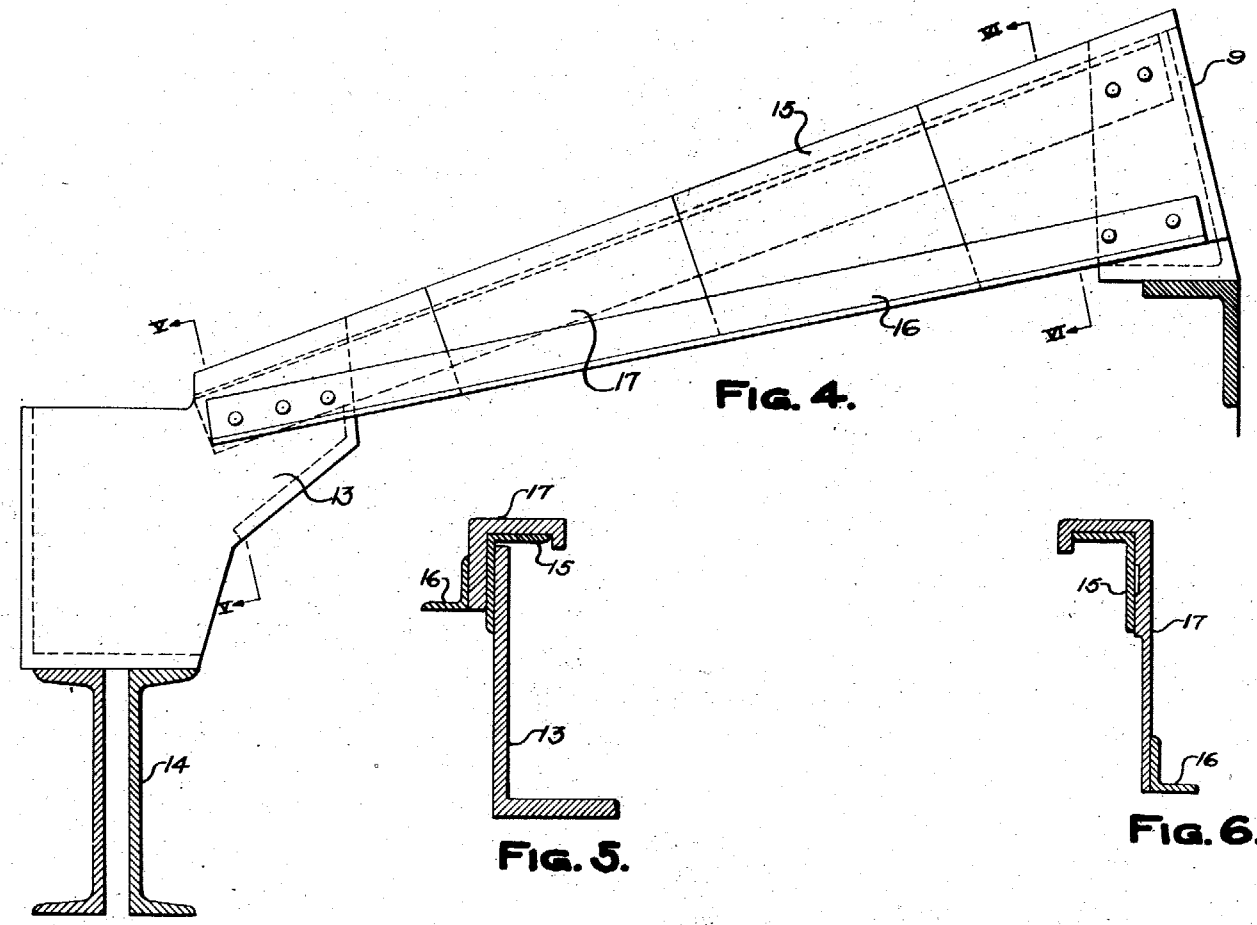
Fig. 4 is a side elevation showing the supporting members and side wall plates.
Fig. 5 is a section on line V—V of Fig. 4.
Fig. 6 is a section on line VI—VI ofFig. 4.

Referring to the drawings, the stoker includes a fuel feeding hopper 5 which may be of any preferred construction. The discharge channel 6 of the hopper extends beneath the front wall 7 of the furnace, and fuel is forced through the channel by means of a reciprocating plunger 8 which may be operated in any desired manner. A casting 9 which extends entirely across the width of the furnace serves to support and connect the fuel retorts which are arranged in spaced parallel relation across the width of the furnace. The hopper castings 5 are bolted or otherwise secured to the front casting 9, and the hoppers and front casting are supported upon an I-beam 11 which is mounted upon any suitable foundation such as that indicated at 12.

Spaced from the front support and extending across the furnace is a rear grate support casting 13 mounted upon structural frames 14 which may be mounted directly upon the foundations beneath the casting or supported by the side walls of the furnace. The rear casting 13 and the front casting 9 are connected at spaced intervals by means of frames fabricated from commercial shapes.

In the construction illustrated in Figure 2, each frame includes an upper tie member 15 and a lower tie member 16 formed of angle iron. The ends of the tie members are bolted securely to the castings 13 and 9 and form a connection, therefor, which may expand and contract with variations in temperature without danger of failure. Side plates 17, which are formed in sections and which may be made either of cast or plate iron, are bolted to the upper and lower tie members and form the side walls of the retorts. Sectional bottom plates 18 are placed across the space between the two adjacent frames and rest upon the tie members 16 to which they are bolted. The side and bottom plates form a retort which extends from the discharge channel of the hopper to a point above the casting 13. The casting 13 is so formed that a continuation of the retort bottom extends to the lower end of the grate to be hereinafter described.

Rows of tuyères 19 are mounted upon the sides of adjacent retorts and with the form of side plates illustrated in Fig. 2, rest upon upper flanges 20 which cover the angle irons 15. In Fig. 3 a modified construction is illustrated wherein the tuyères 19′ rest directly upon the angle iron 15′. It will be seen that the plates 17′ may be replaced without disturbing the tuyères.

The tuyères 19 extend from a point adjacent the front wall of the furnace to the lower end of the grate and overlap a dump grate 21 which extends entirely across the width of the grate and is pivoted to the casting 13 at 22.

Each retort may be provided with a secondary or auxiliary ram 26 which reciprocates in the lower end of the retort adjacent the lower tuyères 19 and which agitates the fuel in the lower portion of the grate. The ram is connected to a driving means, not shown, by means of a connecting rod 27 which extends forwardly and projects through an upper casting.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. An underfeed stoker construction comprising a plurality of retorts arranged in spaced parallel relation, each comprising upper and lower pairs of structural frame members, detachable side plates secured to each upper frame member and cooperating with the corresponding lower frame member and detachable bottom plates connecting the lower frame members, the said plates forming side and bottom walls respectively of the retorts, and grate tuyères mounted on adjacent upper frame members of the retorts and bridging the space between the retorts.

2. In an underfeed stoker having a combustion grate formed of alternately disposed tuyères and retorts, front and rear supports for the grate, a plurality of tie members extending between and connected to said supports, plates forming the side and bottom walls of said retorts secured to said tie members, and tuyères bridging the spaces between and supported upon said retorts.

3. In an underfeed stoker having a combustion grate formed of alternately disposed tuyères and retorts, front and rear supports for the grate, a plurality of tie members extending between and connected to said supports, and so disposed relatively to each other as to determine the cross sectional dimensions and spacing of said retorts, plates secured to said tie members to form side and bottom walls of said retorts and tuyères bridging the spaces between and supported upon said retorts.

4. In an underfeed stoker having a combustion grate formed of alternately disposed tuyères and retorts, front and rear supports for the grate, an upper series of tie members and a corresponding lower series of tie members extending between and connected to said supports, plates secured to tie members to form side and bottom walls of spaced retorts and tuyères bridging the spaces between and supported upon said retorts.

5. In an underfeed stoker having a combustion grate formed of alternately disposed tuyères and retorts, front and rear supports for the grate, a plurality of pairs of upper tie members and a plurality of corresponding pairs of lower tie members extending between and connected to said supports, plates secured to each upper and corresponding lower tie member to form side walls and plates secured to the lower tie members to form bottom walls of the retorts, and tuyères bridging the spaces between and supported upon said retorts.

6. In an underfeed stoker having a combustion grate formed of spaced rows of tuyères extending longitudinally of the furnace and retorts between said rows of tuyères, a unit retort for said stoker comprising a plurality of pairs of longitudinally extending tie members, and detachable plates secured to said tie members to form side and bottom walls of the retorts.

7. In an underfeed stoker having a combustion grate formed of spaced rows of tuyères extending longitudinally of the furnace and retorts between said rows of tuyères, a unit retort for said stoker comprising a pair of upper and a pair of lower longitudinally extending tie members, and plates secured on said tie members to form side and bottom walls of the retort.

8. An underfeed stoker construction comprising a plurality of retorts arranged in spaced parallel relation, each comprising upper and lower pairs of structural frame members, detachable sectional side plates secured between each upper and the corresponding lower member and detachable sectional bottom plates connecting the lower frame members, the said plates forming side and bottom walls respectively of said retorts and tuyères mounted on adjacent upper frame members of the retorts and bridging the space between them.

9. In a downwardly inclined stoker of the type having alternately-arranged retorts and tuyère rows, the combination of transversely-disposed front and rear supporting structures; a plurality of spaced, longitudinally-arranged substantially parallel beam members extending from the front to the rear supporting structure and carried at their ends by said structures; a plurality of upright plates detachably secured to each of the beam members to form sectional retort side walls; bottom-forming members disposed between alternate adjacent retort side walls; and tuyère plates bridging the space between and supported by the side walls of adjacent retorts to form the tuyère rows.

10. In stoker apparatus, the combination of transversely-disposed front and rear supporting structures; a plurality of spaced, longitudinally-extending substantially parallel beam members extending from the front to the rear supporting structures and carried at their ends by said supporting structures; and a combustion grate comprising alternately-arranged retorts and tuyère rows carried by the beam members; the retorts including sectional side walls formed of plates detachably secured to the beam members; and the tuyère rows being provided by the side walls of adjacent retorts and by tuyère plates bridging the space between and supported by such side walls.

11. In a furnace, the combination of a supporting structure disposed transversely of the furnace and adjacent one wall thereof; a second supporting structure disposed in spaced relation to the first supporting structure and at a lower level; and a downwardly inclined stoker extending between and carried by the two supporting structures and comprising a plurality of spaced substantially parallel beam members carried at their ends by the supporting structures, a plurality of upright plates detachably secured to each of the beam members to form sectional retort side walls, means disposed between alternate adjacent retort side walls to provide bottoms for the retorts, and tuyère plates bridging the space between and supported by the side walls of adjacent retorts.

In testimony whereof I have hereunto subscribed my name this 2nd day of July, 1929.

OTTO ARAM.